(12) United States Patent
Yoshida et al.

(10) Patent No.: US 6,270,248 B1
(45) Date of Patent: Aug. 7, 2001

(54) MIXING APPARATUS FOR A MOLTEN SUBSTANCE OF HIGH TEMPERATURE

(75) Inventors: Shouzou Yoshida; Yasuhisa Hirabayashi; Ichiro Terao, all of Funabashi (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/413,898

(22) Filed: Oct. 7, 1999

(51) Int. Cl.$^7$ ........................................................ B01F 7/16
(52) U.S. Cl. .................... 366/300; 366/297; 366/301; 65/170; 65/178
(58) Field of Search ................. 65/170, 178; 366/297, 366/300, 301

(56) References Cited

U.S. PATENT DOCUMENTS

| | | |
|---|---|---|
| 1,988,783 | 1/1935 | Canfield . |
| 2,467,809 | 4/1949 | Cannon, Jr. et al. . |
| 2,750,161 | * 6/1956 | Simmons ................. 65/178 |
| 3,350,187 | 10/1967 | Brichard et al. . |
| 3,957,479 | 5/1976 | McMaster et al. . |
| 4,046,546 | * 9/1977 | Hynd ..................... 65/178 |
| 4,156,342 | 5/1979 | Korta et al. . |
| 4,339,261 | 7/1982 | Walton et al. . |
| 4,493,557 | 1/1985 | Nayak et al. . |
| 4,975,188 | 12/1990 | Brunsell et al. . |
| 5,006,145 | 4/1991 | Brinker . |
| 5,087,176 | 2/1992 | Wieland . |

FOREIGN PATENT DOCUMENTS

| | | |
|---|---|---|
| 28 29 150 | 1/1980 | (DE) . |
| 198 06 543 | 8/1999 | (DE) . |
| 792 996 | 1/1936 | (FR) . |
| 59-130524 | 7/1984 | (JP) . |

\* cited by examiner

*Primary Examiner*—James Derrington
(74) *Attorney, Agent, or Firm*—Oblon, Spivak, McClelland, Maier & Neustadt, P.C.

(57) ABSTRACT

A mixing apparatus which prevents erosion of left and right side walls 12a 12b for a flow path 12 for a molten substance of high temperature M and homogenizes the molten substance of high temperature while occurrence of air bubbles is prevented, wherein there are a plurality of mixing units 11 in the flow path 12; an even number of pairs of mixing units 11 are arranged symmetrically with respect to the center line in a longitudinal direction of the flow path 12 and the gap s between a left side wall or a right side wall and an outer peripheral edge of a mixing blade 14 is determined to be 0.04–0.1 times as much as the distance W between the left and right side walls 12a, 12b.

8 Claims, 7 Drawing Sheets

MIXING APPARATUS FOR A MOLTEN SUBSTANCE OF HIGH TEMPERATURE

The present invention relates to a mixing apparatus for a molten substance of high temperature for mixing to homogenize a molten substance of high temperature such as molten glass flowing in a flow path defined by left and right side walls while occurrence of air bubbles is suppressed.

Further, the present invention relates to such mixing apparatus provided with a lubricant supplying means for supplying lubricant to a bearing member for supporting a rotating shaft having mixing blades and a gear box.

There has been conducted to mix molten glass produced from a furnace by arranging a mixing apparatus in a flow path so as to homogenize a glass composition or to provide a uniform temperature before a shaping operation. As such mixing apparatus, there has been known, for example, JP-A-59-130524 wherein a plurality of mixing units, each provided with a rotating shaft having radially extending mixing blades, are disposed in a side-by-side relation in a flow path for the molten glass. Specifically, an even number of pair of mixing units are arranged symmetrically with respect to the center line along the flow path so that mixing blades of adjacent mixing units are rotated in a substantially meshing state, whereby a molten substance of high temperature such as the molten glass can be mixed.

Figure 13:
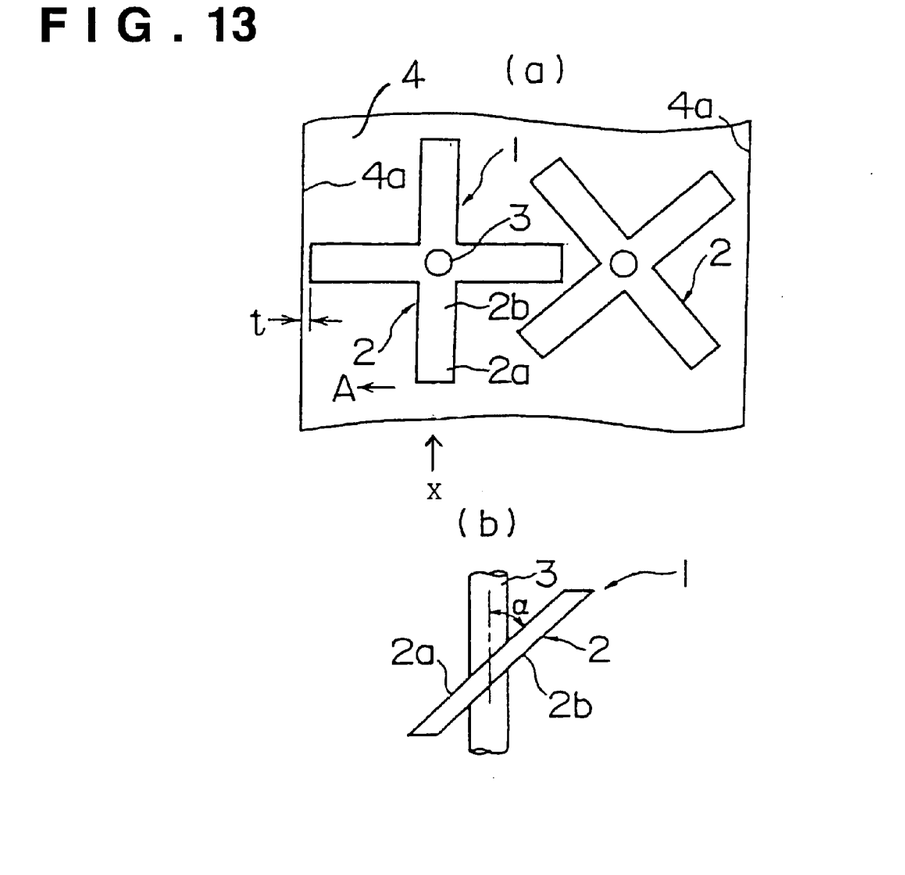
FIG. 13a is a plan view of a conventional mixing apparatus and FIG. 13b is a view from a direction of an arrow mark X.

An example of a conventional mixing unit 1 is shown in FIG. 13 wherein FIG. 13$a$ is a plan view and FIG. 13$b$ is a view from a direction of an arrow mark X in FIG. 13$a$. As shown in the Figures, each mixing blade 2 is inclined with respect to a direction A tangential to a circle formed by the rotation of the mixing blade 2 wherein the mixing blade 2 has a working face 2$a$ which inclines upward from a front part of the direction of rotation to a rear part of the direction of rotation and a working face 2$b$ which inclines downward from the front part to the rear part in a direction of rotation. Further, an angle of intersection $\alpha$ between the working face 2$a$ and the rotating shaft 3 of the mixing unit 1 is 45°. The shape of an edge face of the mixing blade 2, when viewed from the direction of the mark X (in a front view) in FIG. 13$b$, is a rhomboid.

In the conventional mixing apparatus, the gap t between either one of left and right side walls 4$a$, 4$a$ for forming a flow path 4 for the molten substance of high temperature and an outer peripheral edge 2$b$ of a mixing blade 2 is determined to be 1.27–2.54 cm. However, the gap t was too narrow and bricks forming the left and right side walls 4$a$, 4$a$ were eroded due to a flow of the molten substance of high temperature whereby a component of the eroded bricks entered into the molten substance of high temperature to thereby cause deterioration of the quality of a glass product produced from the molten substance of high temperature. Further, there was a large disturbance in the surface of the molten substance due to the mixing function of the blades and air bubbles were apt to enter into the molten substance whereby a percentage of defective products increased.

Further, the mixing apparatus having mixing blades 2 disposed at an angle of intersection $\alpha$ of about 45° was insufficient to obtain a pumping function for moving the molten substance of high temperature upward or downward, and was insufficient to prevent the involvement of air bubbles to the molten substance.

In the mixing apparatus disclosed in JP-A-59-130524, a lower portion of the rotating shaft having the mixing blades of each of the mixing units is extended into the flow path for the molten glass, and an upper portion thereof is supported by a bearing member, and an upper end of each of the rotating shafts is attached with a gear wheel associated with other gear wheels. When one of the rotating shafts arranged in parallel is rotated by means of a motor or the like, the rotating shafts are rotated by the gear wheels which are associated in a manner that adjacent rotating shafts are alternately and simultaneously driven in directions reverse to each other.

It is a first object of the present invention to provide a mixing apparatus for a molten substance of high temperature which can improve the quality of glass products by preventing erosion of bricks forming left and right side walls for providing a flow path and which can sufficiently homogenize a molten substance of high temperature while air bubbles are prevented from mixing.

In a conventional mixing apparatus, lubricant such as grease is filled in the bearing member and a gear box accommodating therein associated gear wheels. However, temperature in an upper space of the flow path for molten glass is elevated to, for example, about 150° C., as a result of which the lubricant may be deteriorated or solidified, or a shaft seal portion (an oil seal) is deteriorated to cause leakage of the lubricant. Accordingly, it was necessary to supply oil frequently by manual operations.

Accordingly, it is a second object of the present invention to provide a mixing apparatus to be disposed in a flow path for a molten substance of high temperature, which can perform automatically the supply of lubricant to the bearing member and the gear box.

In order to achieve the first object, there is provided a mixing apparatus for a molten substance of high temperature which comprises a plurality of mixing units for mixing a molten substance of high temperature in a flow path for passing the molten substance, which is defined by left and right side walls, wherein the plurality of mixing units are arranged in a side-by-side relation so as to traverse the flow path, and mixing blades of adjacent mixing units are rotated in a state of substantially meshing with each other, said mixing apparatus being characterized in that the gap between a left side wall or a right side wall and an outer peripheral edge of a mixing blade is 0.04–0.1 times as much as the distance between the left and right side walls.

According to the construction described above of the present invention, the gap between a left side wall or a right side wall and an outer peripheral edge of a mixing blade is 0.04 times or more as much as the distance between the left and right side walls, whereby erosion of the left and right side walls can be prevented to minimize an adverse affect to the quality of glass products, and disturbance in the surface of molten substance due to the mixing function of the mixing blades can be reduced to thereby prevent air bubbles from mixing with the molten substance. Further, the gap between the left side wall or the right side wall and the outer peripheral edge of a mixing blade is 0.1 times or less as much as the distance between the left and right walls, whereby an unhomogenized portion of the molten substance of high temperature can be prevented from passing through, and a sufficient mixing function can be provided to obtain a desired homogenization.

According to a preferred embodiment of the abovementioned invention, the mixing units for mixing the molten substance of high temperature are arranged in such a manner that an even number of pairs of mixing units are disposed symmetrically with respect to the center line between the left and right side walls for defining the flow path for the molten substance.

Further, each of the mixing blades has a wedge shape in cross section in the observation of the blade from a direction tangential to a circle of rotation of the blade wherein a working face which inclines upward from a front part to a rear part with respect to a direction of rotation of the blade, is formed.

With the mixing blade having a wedge shape wherein a working face inclining upward is formed, a pumping function to move the molten substance upward is obtainable. The wedge-shaped mixing blade reduces an eddy current which may be produced at a rear face of the mixing blade, whereby a mixing function can be improved and occurrence of air bubbles can be reduced.

According to a further preferred embodiment of the present invention, each of the mixing blades has an angle of intersection of 55–80° between the working face and a rotating shaft provided in each of the mixing units.

Further, the angle of intersection of 55–80° can further improve the pumping function to the molten substance whereby a sufficient homogenization of the molten substance is obtainable.

Further, each of the mixing blades has a diameter of not more than 40% of the distance between the left and right side walls.

The mixing blades contrived as described above can minimize disturbance of the surface of the molten substance due to the mixing function by the mixing blades and reduce occurrence of air bubbles.

In order to achieve the above-mentioned second object of the present invention, there is provided a mixing apparatus for a molten substance of high temperature comprising a plurality of mixing units disposed in a flow path for passing a molten substance wherein each of the mixing units has a rotating shaft which has an outer peripheral surface in its lower portion, with which mixing blades for mixing the molten substance of high temperature are attached; an upper portion of the rotating shaft is supported by a plurality of vertically spaced bearing members and an upper end of the rotating shaft is inserted into a gear box; a sleeve is disposed between the vertically spaced bearing members so as to surround the rotating shaft; a lubricant circulation passage is formed to circulate lubricant from a lower bearing member through the sleeve, an upper bearing member and the gear box to the lower bearing member, and a pump is provided to circulate the lubricant through the lubricant circulation passage.

According to the above-mentioned invention, the lubricant is circulated through the lubricant circulation passage by means of the pump, whereby the lubricant can always be supplied to the bearing members and the gear box as a result of which a risk of wearing or burning of the bearing members or the gear box can be prevented even when an upper portion of the flow path for molten substance is in a state of high temperature, and a long term continuous operation can be conducted.

The flowing direction of the lubricant through the lubricant circulation passage is not limited to the above-mentioned direction but it may be passed in the reverse direction.

According to a preferred embodiment of the present invention, a water cooled jacket is disposed to surround an outer periphery of the sleeve. According to this embodiment, the bearing members are cooled by means of the water cooled jacket whereby deterioration of a shaft seal portion for lubricant provided in the bearing member can be prevented.

Further, the lubricant can be maintained at an appropriate temperature because the lubricant is cooled by the water cooled jacket when it is passed through the sleeve.

In a further preferred embodiment of the present invention, the lower bearing member is provided with two vertically spaced shaft seal portions to seal an axial end of the lubricant circulation passage, and a discharge port is formed to communicate a space formed between the two shaft seal portions so that lubricant leaking from an upper shaft seal portion is discharged.

According to the above-mentioned embodiment, when lubricant leaks from a shaft seal portion due to a pressure increase in the flow path which may be caused by the solidification of the lubricant or deterioration of the seal portion, the leaked lubricant enters into a space between the upper shaft seal portion and the lower shaft seal portion and is discharged through the discharge port. Accordingly, the lubricant is prevented from mixing with the molten substance of high temperature. Further, a degree of deterioration of the shaft seal portion can be judged by detecting an amount of lubricant leaking from the discharge port, and a timing of maintenance can be known.

Preferred embodiments of the mixing apparatus for a molten substance of high temperature according to the present invention will be described with reference to the drawings.

Figure 1:
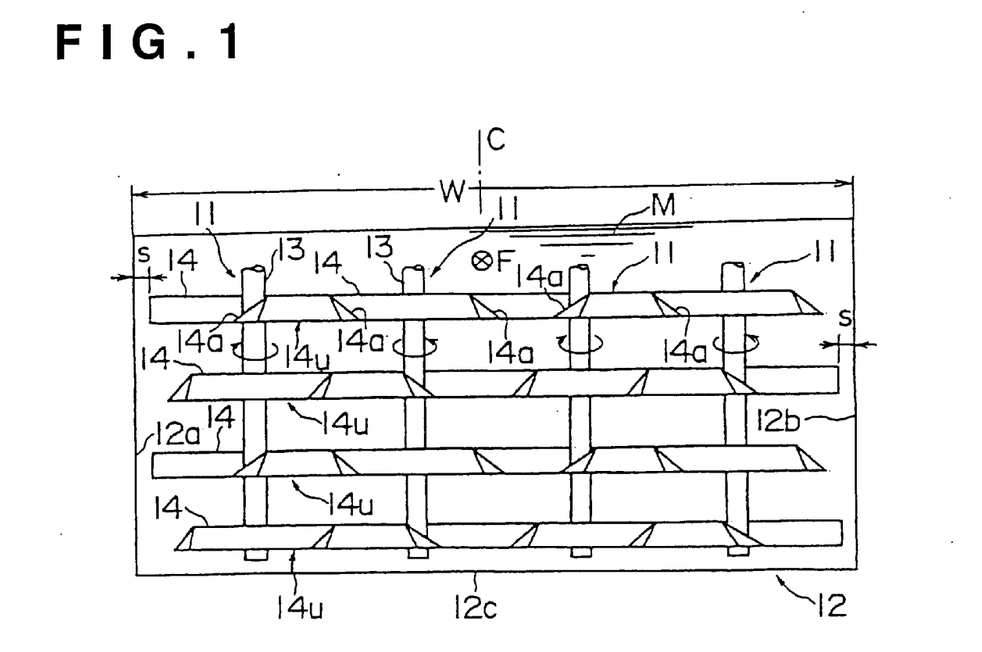
FIG. 1 is a front view of an embodiment of the mixing apparatus according to the present invention wherein a plurality of mixing units are disposed in a flow path for a molten substance of high temperature.
Figure 2:
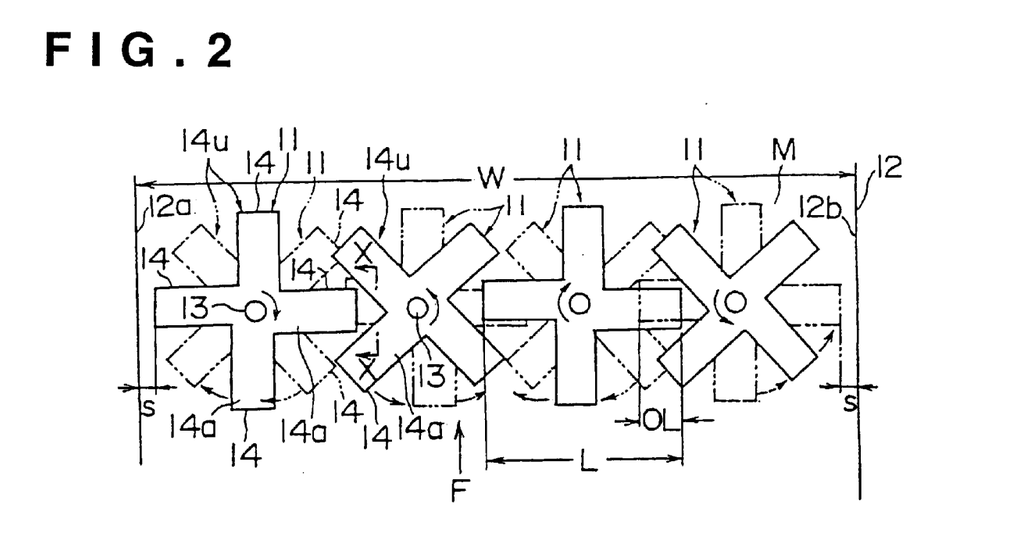
FIG. 2 is a plan view of the mixing apparatus shown FIG. 1.
Figure 3:
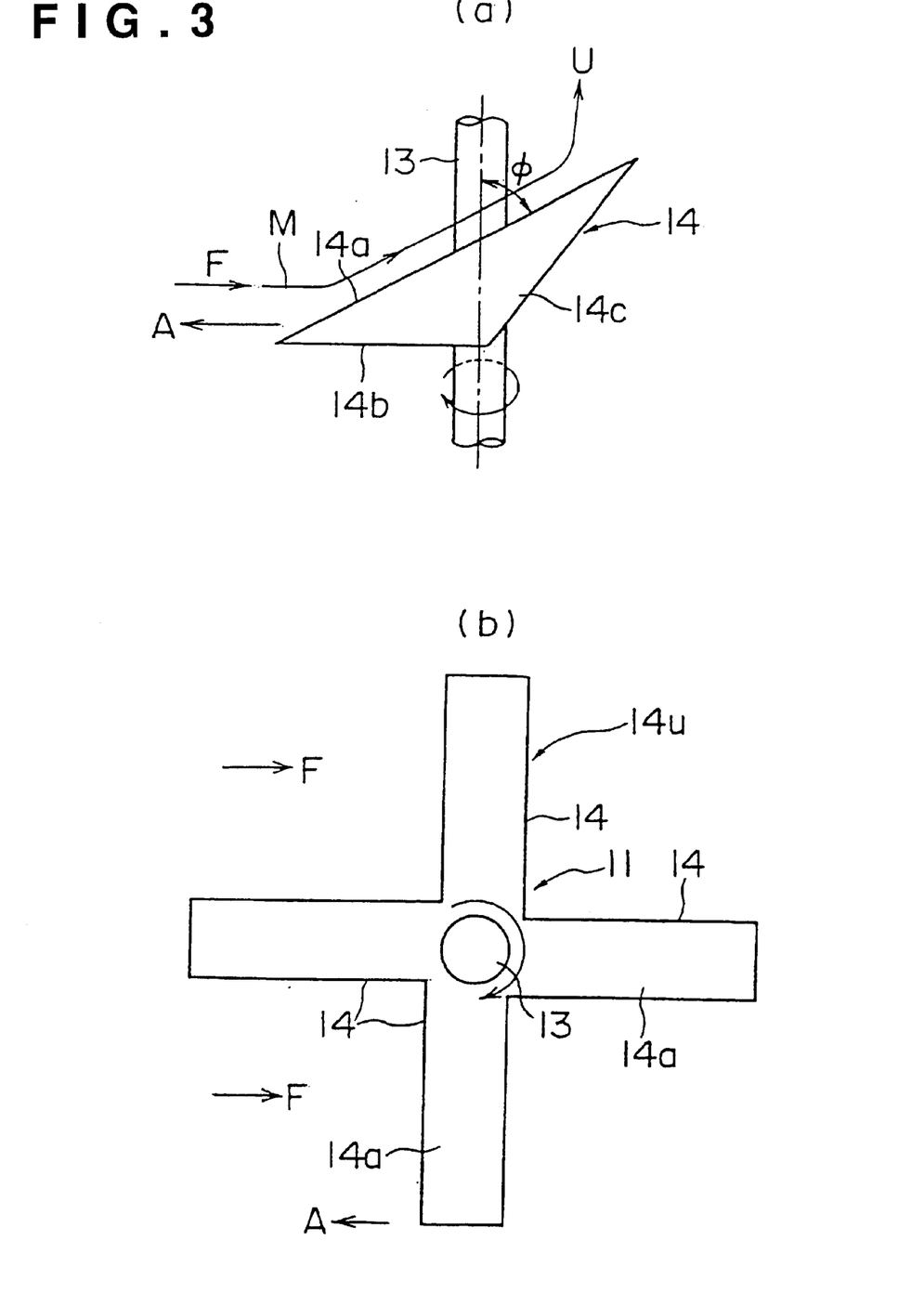
FIG. 3a is a diagram of a mixing unit viewed from an arrow mark direction X—X in FIG. 2
FIG. 3b is an enlarged plan view of the mixing unit.
Figure 4:
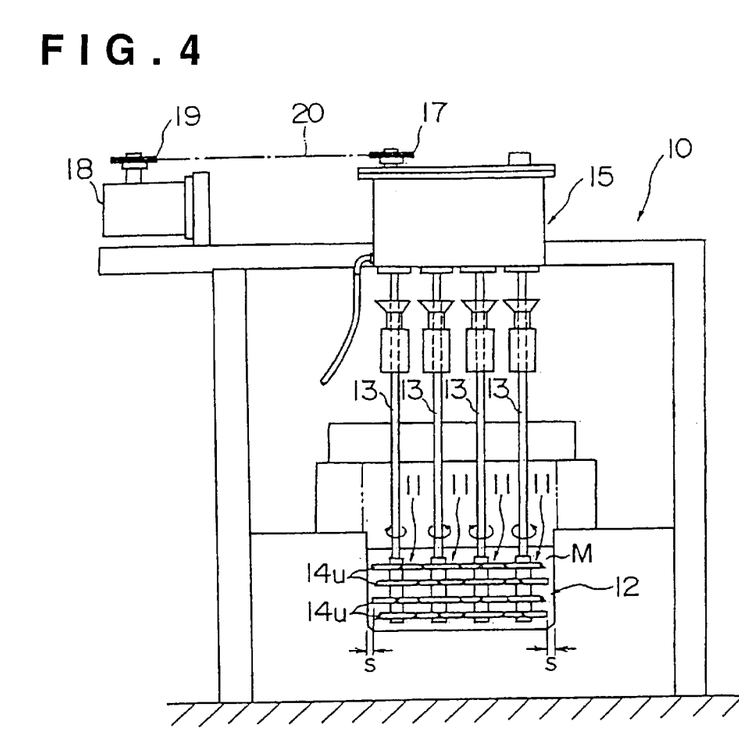
FIG. 4 is a front view showing the entire structure of the mixing apparatus.

FIGS. 1 to 5 show a first embodiment of the mixing apparatus of the present invention. A molten substance of high temperature M is passed in a flow path 12 surrounded by left and right side walls 12a, 12b and a bottom wall 12c in a direction from a front surface side of the paper where FIG. 1 is depicted to a rear surface side of the paper. In FIG. 2, the molten substance M is passed in the flow path 12 in a direction of an allow mark F.

The mixing apparatus of this embodiment is provided with four mixing units 11 arranged in a side-by-side relation so as to traverse the flow path in a width direction of the flow path 12. Each of the mixing units 11 has a rotating shaft 13. On the rotating shaft 13, a plurality of stages (e.g., four stages in FIG. 1) of blade units 14U are arranged in equal intervals in a vertical direction. Each of the blade units 14U comprises a plurality (four in FIG. 1) of mixing blades 14 extending radially. As shown in FIG. 2, vertically adjacent blade units 14U have a difference of 45° in terms of phase of mixing blades 14 attached to the rotating shaft 13.

With respect to the mixing units 11 each having blade units 14U on its rotating shaft 13, an even number of pairs of mixing units 11 (two pairs in FIG. 2) are arranged symmetrically with respect to the center line C between left and right side walls for the flow path 12 shown in FIG. 1 so that the mixing blades 14 of adjacent mixing units 11 are rotated in an opposite direction to each other in a state of substantially meshing with each other. The rotation of the mixing blades 14 of adjacent mixing units 11 in a state of substantially meshing with each other means that a mixing blade of a mixing unit is between adjacent mixing blades of another mixing unit meshing therewith so as not to cause interference of a free end of the mixing blade with the other mixing unit. The rotation of an even number of pairs of mixing units 11 in a state of substantially meshing with each other can effectively prevent the molten substance M of high temperature from passing free through a space between mixing blades 14, 14.

The provision of the blade units 14U on each of the rotating shaft 13 at plural stages in a vertical direction can respond to a depth of the flow path 12. Namely, uniformity in the mixing function at each position in the direction of the depth of the flow path 12 can be assured by providing the mixing blades of the vertically adjacent blade units 14U to have a certain difference of phase.

Figure 5:
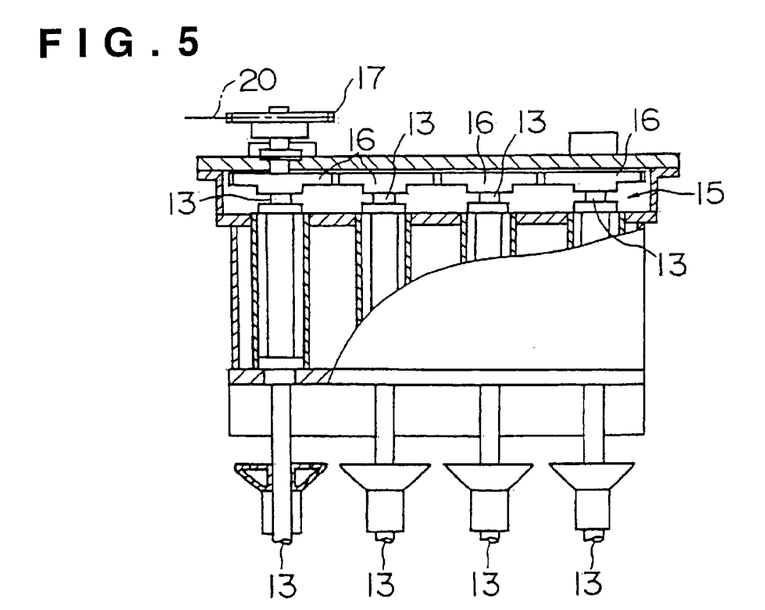
FIG. 5 is an enlarged front view partly omitted showing a driving mechanism of the mixing apparatus.

As shown in FIG. 5, each of the rotating shafts 13 is provided with a gear wheel 16. A driven sprocket wheel 17 is attached to a rotating shaft 13 (e.g., the rotating shaft 13 at a left end position in FIG. 5). A driving chain 20 is wound around the driven sprocket 17 and a driving sprocket wheel 19 which is attached to the driving shaft of a motor 18.

In FIG. 3a, each of the mixing blades 14 has a working face 14a inclining upward from a front part to a rear part of a direction of rotation, in a cross-sectional view observed from a direction A tangential to a circle of rotation of the blade. A lower surface 14b is extended from a lower end of the working face 14a in a direction substantially horizontal and a rear face 14c is provided to connect the working face 14a to the lower face 14b. the working face 14a and the lower face 14b form a wedge shape of the mixing blade 14.

Since each of the mixing blades 14 is rotated so that the working face 14a always faces a direction of rotation of the mixing blades 14, an upward pumping action is given to the molten substance M of high temperature due to the working face 14a as shown diagrammatically by an arrow line U. In this case, it is preferable that an angle of intersection φ formed between the working face 14a and the axial center of the rotating shaft 13 of a mixing unit 11 is 55°–80°. By determining the angle of intersection φ in such arrange, the above-mentioned pumping action and a mixing function caused by the pumping action can effectively be provided. When the angle of intersection φ is larger or smaller than that range, the mixing function is reduced.

As described before, the mixing blades 14 of laterally adjacent mixing units 11 are rotated mutually in reverse directions, wherein each of the working faces 14a is determined to face a front part in the direction A tangential to a circle of rotation of the mixing blades 14. Accordingly, the same upward pumping actions act on the molten substance M of high temperature.

The greatest feature of the present invention resides in that the gap s between a left side wall 12a or a right side wall 12b for the flow path 12 and an outer peripheral edge of a mixing place 14 is determined to be 0.04–0.1 times as much as the distance W between the left and right side walls 12a, 12b. When the gap s is smaller than that range, bricks constituting the left and right side walls 12a, 12b are eroded due to a flow F of the molten substance M of high temperature and the mixing function to the molten substance M. When any component of eroded bricks is mixed with the molten substance M, the quality of a glass product made of the molten substance M becomes poor. Further, there causes a large disturbance of the surface of the molten substance due to the mixing function with a result that air bubbles are apt to enter into. On the other hand, when the gap s is larger than that range, an amount of the molten substance M passing freely between an outer peripheral edge of a mixing blade 14 and a left side wall 12a or a right side wall 12b is increased whereby the mixing function of the mixing blades 14 is reduced, and uniformity in the molten substance is reduced.

It is preferable that the diameter L of any mixing blade 14 is not more than 40% of the distance W between the left and right side walls 12a, 12b. When the diameter L of the mixing blade 14 is larger than such value, air bubbles are apt to enter due to a large disturbance of the surface of the molten substance. Further, it is preferable that an overlapping portion OL of mixing blades of adjacent mixing units 11 is about 20% of the diameter L of any of the mixing blades 14.

Accordingly, when the molten substance of high temperature M such as molten glass is passed through the mixing apparatus disposed in the flow path 12, working faces 14a of rotating mixing blades 14 provide an upward pumping function whereby the molten substance M of high temperature is effectively mixed and homogenized.

In this case, since the gap s between a left side wall 12a or a right side wall 12b for the flow path 12 and an outer peripheral edge of any mixing blade 14 is 0.04–0.1 times as much as the distance W between the left and right side walls 12a, 12b, the erosion of the left and right side walls 12a, 12b can be reduced; the mixing of air bubbles is prevented, and the disturbance of the surface of the molten substance is suppressed while the mixing function is not reduced.

As a result, a molten substance of high temperature M such as molten glass which is sufficiently homogenized and minimizes mixing of air bubbles can be obtained, and the quality or yield of glass products made of the molten substance of high temperature can be improved.

FIGS. 6 to 12 show another embodiment of the mixing apparatus for a molten substance of high temperature according to the present invention.

The mixing apparatus has a plurality of mixing unit 23 which are disposed in a flow path for a molten substance of high temperature. Each of the mixing unit 23 has a rotating shaft 24 having a lower portion where a plurality of mixing blades 25 are attached to an outer periphery thereof; an upper portion supported by a plurality of vertically spaced bearing members 28, 29 and an upper edge inserted into a gear box 27a, and a sleeve 122 disposed between the vertically spaced bearing members 28, 29 to surround the rotating shaft 24. The mixing apparatus is provided with a lubricant circulation means FM for circulating lubricant through a lower bearing member 29 through the sleeve 122, an upper bearing member 29 and the gear box 27*a* to return again the lubricant to the lower bearing member 29, and a pump 127 for circulating the lubricant through the lubricant circulation means FM.

Figure 8:
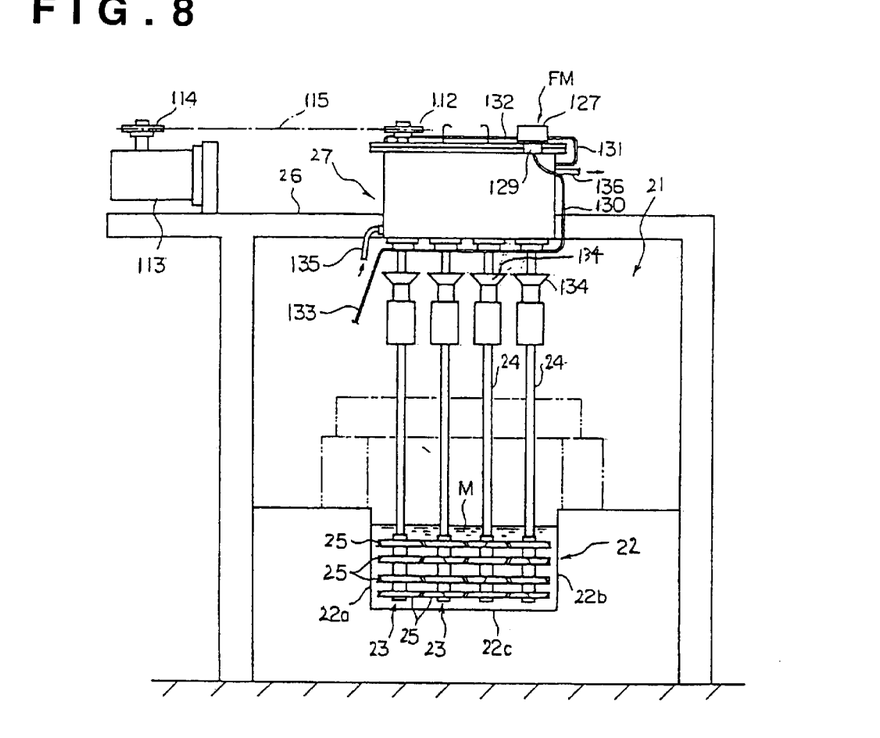
FIG. 8 is a front view showing the entire construction of the mixing apparatus.

In FIG. 8, a molten substance of high temperature such as molten glass is passed through a flow path 22 defined by left and right side walls 22*a*, 22*b* and a bottom wall 22*c* in a direction from a front surface side of the paper in which FIG. 8 is depicted to a rear surface side of the paper. The mixing apparatus has the mixing units 23 each comprising a rotating shaft 24 and the mixing blades 25 which are attached, at four stages in a vertical direction, onto an outer periphery of a lower portion of the rotating shaft 24. An even number of mixing units 23 are arranged in a width direction of the flow path 22 (in this embodiment, four mixing units 23 are disposed in a side-by-side relation in a width direction of the flow path 22).

Figure 9:
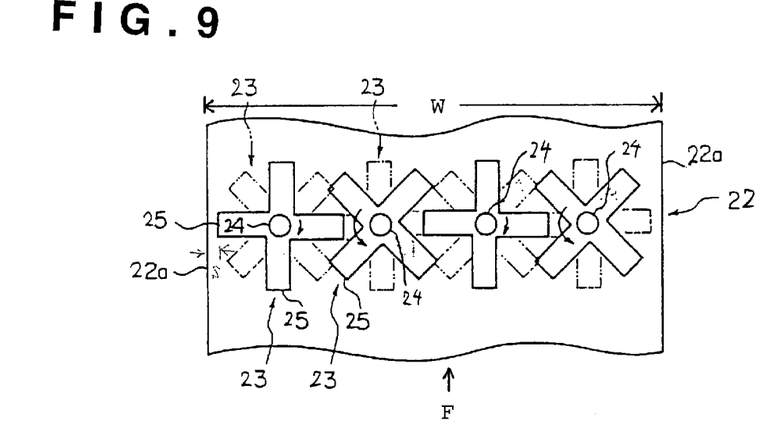
FIG. 9 is a plan view of the mixing apparatus wherein a plurality of mixing units are disposed in the flow path.

In reference to FIGS. 8 and 9, the mixing blades 25 of any stage on the rotating shaft 4 comprises four mixing blades extending radially from the axial center of the shaft. The mixing units 23 are arranged symmetrically with respect to the center line of left and right sides of the flow path 22 wherein mixing blades 25, 25 of laterally adjacent mixing units 23 are rotated in directions opposite to each other in a state substantially meshing therewith. The rotation of the mixing blades 25 of laterally adjacent mixing units 23 in a state of substantially meshing means that the mixing blades of a mixing unit have a phase difference in a direction of rotation from the mixing blades 25 of another mixing unit 23 laterally adjacent thereto and the mixing blades 25 of the adjacent mixing units 23 are rotated in a state that a mixing blade 25 of the former mixing unit 23 is between adjacent mixing blades 25 of the later mixing unit. The rotation of an even number of pairs of mixing units 23 in the above-mentioned substantially meshing state can effectively prevent the molten substance M of high temperature from freely passing through the laterally adjacent mixing blades 25, 25.

With respect to vertically adjacent mixing blades 25 on the same rotating shaft 24, the phase of the mixing blades 25 at a certain stage on the rotating shaft 24 is shifted by 45° from the phase of vertically adjacent stage of mixing blades 25 on the same rotating shaft 24, whereby a uniform mixing force is provided to a direction of the depth of the flow path 22. In FIG. 9, an arrow mark F represents a direction of passing the molten substance M. The arrangement of the mixing units 23 in the flow path shown in FIG. 9 is the same as that of FIG. 2.

A funnel-like oil pan 134 is disposed on the rotating shaft 24 at a portion exposed from the flow path 22 so that lubricant such as grease leaking from a shaft seal portion is prevented from entering into the flow path 22 along the rotating shaft 24. Further, an upper edge portion of the rotating shaft 24 is received in and supported by a support casing 27 attached to a machine frame 26.

Figure 6:
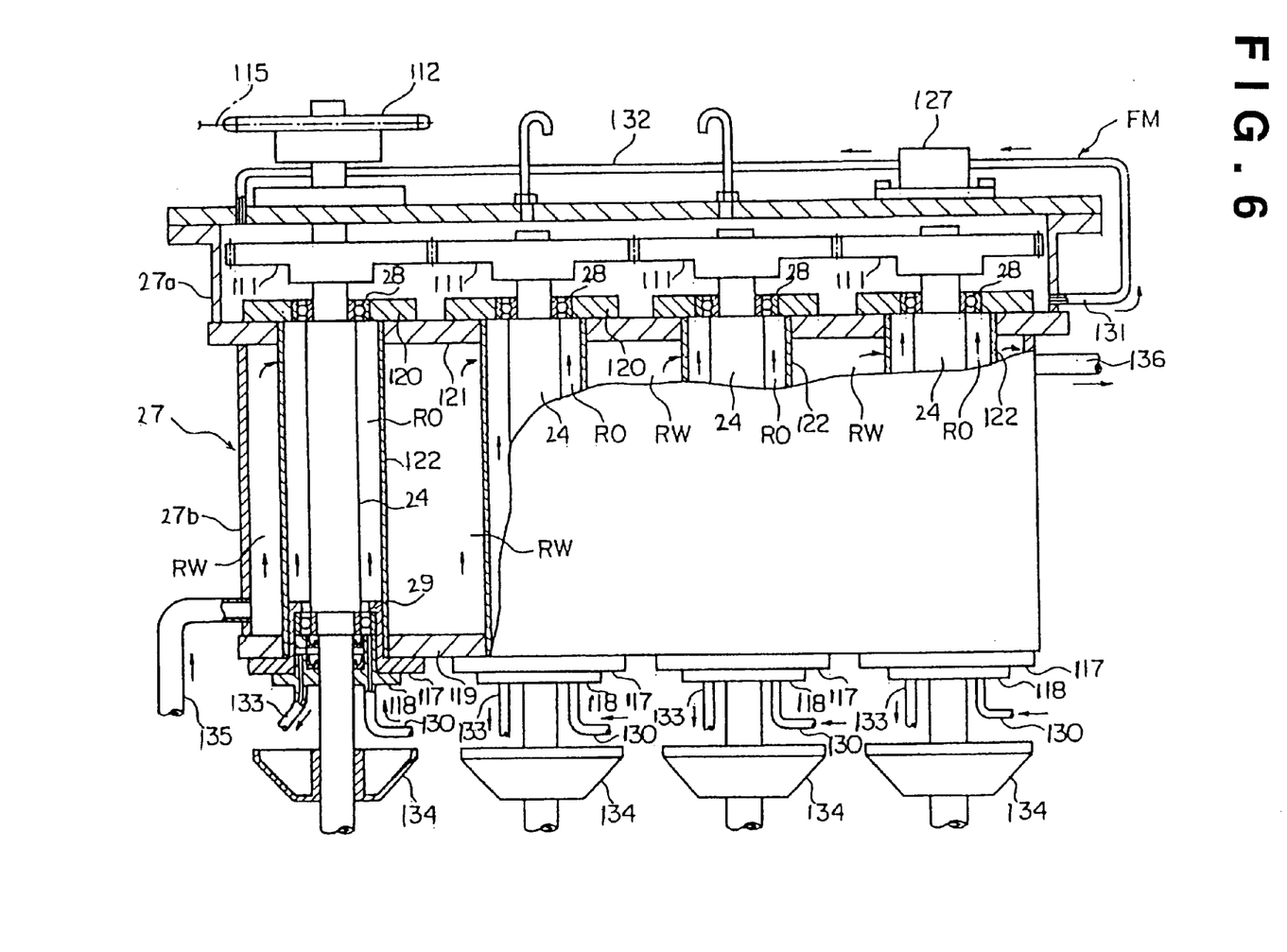
FIG. 6 is a front view partly broken of an embodiment of the mixing apparatus according to the present invention.

Referring also to FIG. 6, an upper portion of each of the rotating shafts 24 is supported by the upper bearing member 28 and the lower bearing member 29 which are received in a support casing 27. The bearing members 28, 29 are ball bearings of a type which allows lubricant to pass through vertically. The sleeve 122 is disposed between the upper and lower bearing members 28, 29 to surround the rotating shaft 24. The inside of the sleeve 122 provides a lubricant flowing chamber RO.

A lower portion of the support casing 27 forms a water cooled jacket 27*b* which surrounds an outer periphery of the sleeve 122 and an inside of the water cooled jacket 27*b* provides a water cooled chamber RW. The water cooled jacket 27*b* is attached with a cooling water supplying pipe 135 and a cooling water discharging pipe 136.

There is the gear box 27*a* in an upper portion of the support casing 27. An upper edge portion of each of the rotating shafts 24 is projected from the upper bearing member 28 to be in the gear box 27*a* and attached with a gear wheel 111. The gear wheel 111 is meshed with another gear wheel 111 or gear wheels 111 attached to adjacent rotating shaft 24 or rotating shafts 24.

The rotating shaft 24 located at the left end in FIG. 6 is penetrated through an upper plate of the support casing 27 to project the outside and attached with a driven sprocket wheel 112. As shown in FIG. 8, a chain 115 is extended around a driving sprocket wheel 114 attached on a motor 113 which is fixed to the machine frame 26 and the driven sprocket wheel 112. Accordingly, when the motor 113 is actuated to rotate the rotating shaft 24 located at the left end side, the rotating shaft 24 adjacent thereto and rotating shafts 24 associated therewith are rotated alternately in reverse directions.

Figure 7:
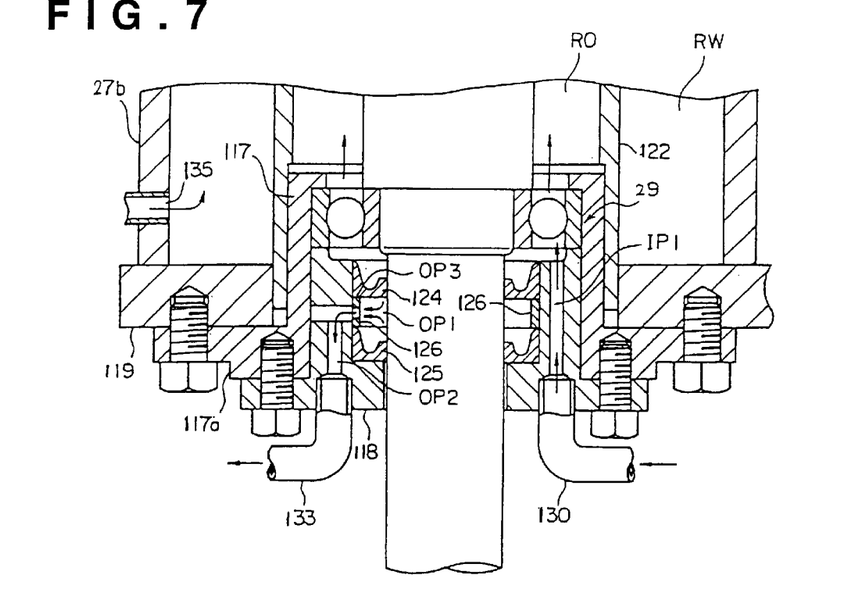
FIG. 7 is an enlarged front view showing a lower bearing portion and portions associated therewith of the mixing apparatus.

Referring also to FIG. 7, the lower bearing member 29 is held in a cylindrical member 117. The cylindrical member 117 has a flange 117*a* at a lower portion, and the flange 117*a* is fixed to a lower plate 119 of the support casing 27. Further, a holding member 118 is attached to a lower face of the flange 117*a* to thereby support the lower bearing member 29.

Between the lower bearing member 29 and the holding member 118, there are two shaft sealing members (oil seals) 124, 125, which are spaced in a vertical direction of the rotating shaft 24 so as to provide a sealing effect to the shaft. The oil sealing members 124, 125 are spaced by means of a spacing ring 126 whereby an oil discharging passage OP1 is formed around the rotating shaft 24.

The holding member 118 has an oil supplying passage IP1 to be communicated with the lower bearing member 29 and an oil discharging passage OP2 for discharging liquid to the outside through the oil discharging passage OP1 between the shaft sealing members 124, 125. Further, an oil discharging passage OP3 communicated with the oil discharging passage OP1 and the oil discharging passage OP2 is formed in the spacing ring 126.

The oil discharging passage OP2 formed in the holding member 118 is connected with an oil discharging pipe 133 which may be, for example, a hose. The free end of the oil discharging pipe 133 is determined at a position convenient for observation so that an amount of leakage of lubricant can be checked.

Figure 10:
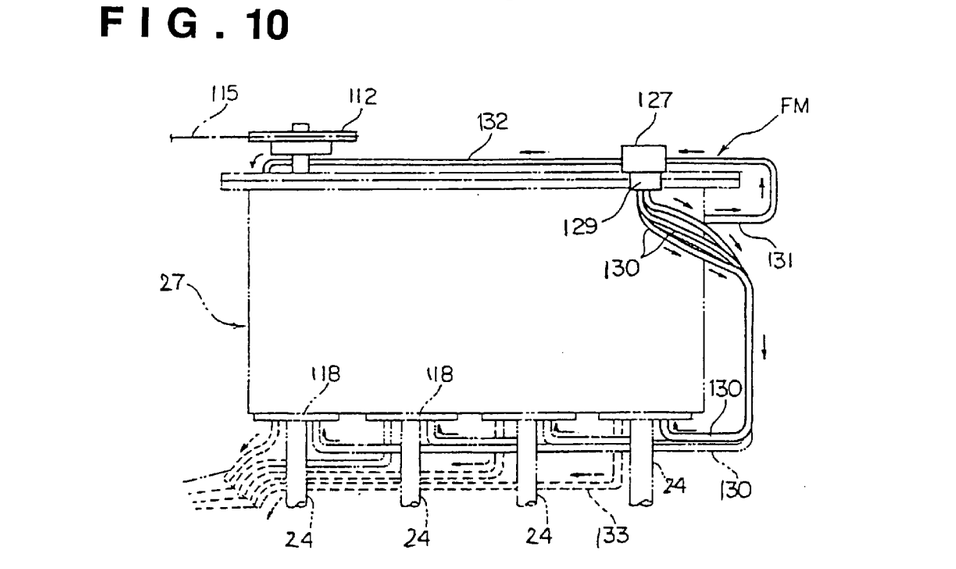
FIG. 10 is a front view showing a lubricant circulation system in the mixing apparatus.

The lubricant circulation means FM as a feature of the present invention comprises a lubricant circulation passage which supplies lubricant from the lower bearing member 29 through the lubricant flowing chamber RO to the upper bearing member 28 to lubricate it, and supplies the lubricant from the upper bearing member 28 through the gear box 27*a* to return the lower bearing member 29. The lubricant circulation passage provided at the outside of the support casing 27 is shown in FIG. 10 as a front view, FIG. 11 as a plan view and FIG. 12 as a bottom view.

Figure 11:
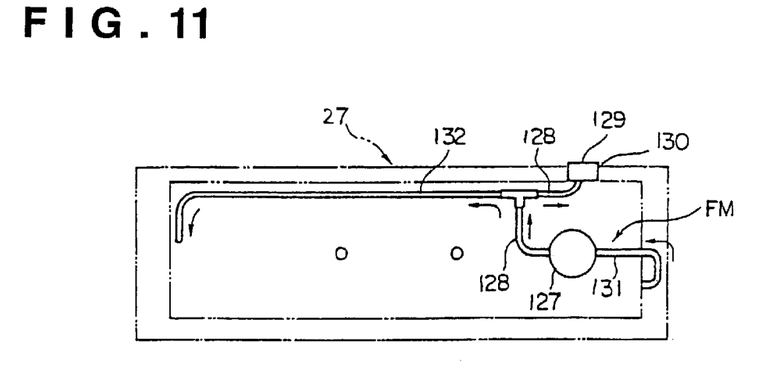
FIG. 11 is a plan view of the lubricant circulation system.
Figure 12:
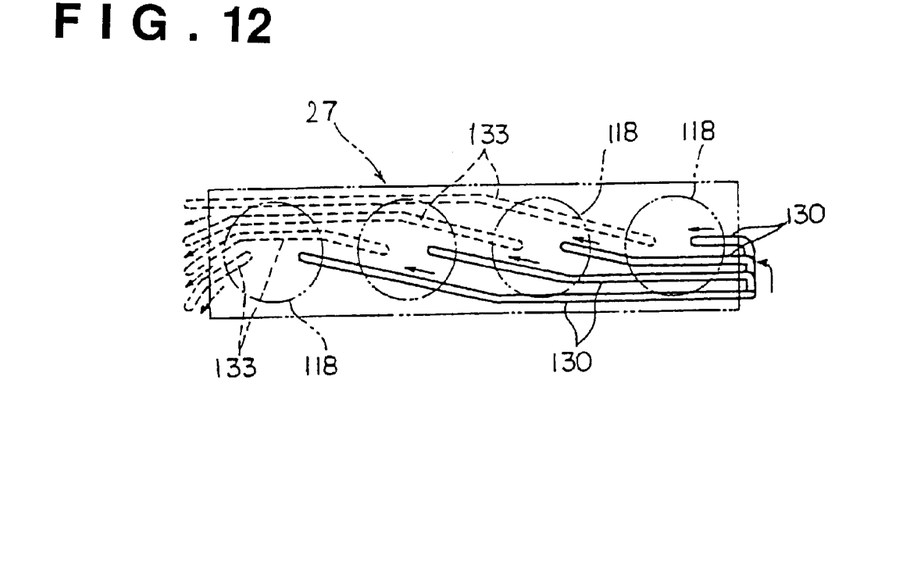
FIG. 12 is a bottom view of the lubricant circulation system.

A pump for lubricant 127 is provided on the support casing 27, and a branch pipe 129 is connected to a supply pipe 128 which is also connected to an outlet port of the pump 127 as shown in FIG. 11. Further, supply pipes 130 are extended from the branch pipe 129. Each of the supply pipes 130 is connected to each of the holding members 118 (four holding members in FIG. 10) for the lower bearing members 29. Each of the supply pipes 130 is connected to each oil supplying passages IP1 (FIG. 7) formed in the holding member 118 provided at a lower position of the rotating shaft 24. An upper end of the lubricant flowing chamber RO is communicated with the inside of the gear box 27a through a space between an outer ring and an inner ring of the ball bearing as the upper bearing member 28 as shown in FIG. 6. An intake pipe 131 is connected to a lower portion of the gear box 27a at a position near the pump for lubricant 127, and the intake pipe 131 is connected to an intake port of the pump 127. In this embodiment, an auxiliary pipe 132 is branched from the supply pipe 128 as shown in FIG. 11. The auxiliary pipe 132 is connected to the gear box 27a at a position remote from the intake pipe 131 so that lubricant is supplied directly from the pump 127 to the gear box 27a.

Grease or a highly viscous oil is used for the lubricant. Cooling water is supplied to the water cooled chamber RW formed in the water cooled jacket 27b through the cooling water supplying pipe 135 as indicated by an arrow mark in FIG. 6 by means of a water pump (not shown), whereby discharged water which has received heat is discharged through a water discharging pipe 136. Further, an air-cooled equipment with an air duct (not shown) may be provided at the lower bearing member 29 so as to assist the cooling of the shaft seal portions 124, 125 by the lubricant and the cooling water.

Operations of the lubricant supplying means FM in the mixing apparatus of the present invention will described with reference to FIGS. 6 to 13 wherein arrow marks indicate flows of the lubricant.

The lubricant supplied from the pump 127 to the supply pipe 128 is fed through the branch pipe 129, the supply pipe 130 into the oil supplying passage IP1 of each of the holding members 118, and is supplied to the lower bearing member 29.

The lubricant which has lubricated and cooled the lower bearing member 29 is passed through the lubricant flowing chamber RO in the sleeve 122 to lubricate and cool the upper bearing member 28, and then, it is supplied from the upper bearing member 28 to the gear box 27a.

The lubricant lubricates and cools the gear wheels 111 operated in association with each other, in the gear box 27a, and then, it takes a cause of the intake pipe 131, the pump 127 and the supply pipe 128 to be returned to the lower bearing member 29. As described above, the circulation of the lubricant is continued.

While the lubricant is passed through the lubricant flowing chamber RO in the sleeve 122 surrounded by the water cooled jacket 27b, the lubricant is cooled by cooling water in the water cooling chamber RW around the sleeve 122, and heat received from the upper and lower bearing members 29, 29 and the gear wheel 111 is radiated to cooling water in the water cooling chamber RW. Accordingly, the lubricant is always maintained to have a low temperature regardless of the continuous circulating operation, and the lubricating property is not lost.

Thus, the lubricant is automatically supplied to the upper and lower bearing members 28, 29 and the gear box 27a through the lubricant supply means FM. Accordingly, it is unnecessary to supply lubricant by manual operations, and labor saving can be achieved. With a result of good lubrication, wearing of the upper and lower bearing members 28, 29 and the gear wheels 111 is reduced, so that smooth operations are assured.

Heat radiation of the lubricant to the water cooled chamber RW in the water cooled jacket 27b suppresses a temperature increase of the lubricant whereby deterioration of the shaft seal portions 124, 125 due to the temperature increase is reduced. It is considered that there is a pressure increase in the circulation passage by the solidification of the lubricant or deterioration of the upper shaft seal portion 124 to thereby cause leakage of the lubricant. However, since the vertically spaced upper and lower shaft seal portions 124, 125 are provided in this embodiment, the lubricant, even if the leakage takes place, is discharged from the oil discharge passage OP1 formed between the shaft seal portions 124, 125 through the oil discharge passages OP3, OP2 to the oil discharging pipe 133, whereby the lubricant is prevented from falling into the flow path 22. Further, the judgement of a timing of maintenance can be easy by checking an amount of leakage of the lubricant.

A direction of circulating the lubricant may be opposite to the above-mentioned way. In this case, the supply port and the intake port of the pump for lubricant 127 should be inverted.

Even in the mixing apparatus of this embodiment, the gap s between a left side wall 22a or a right side wall 22b for the flow path 22 and an outer peripheral edge of a mixing plate 24 as shown in FIG. 10 is determined to be 0.04–0.1 times as much as the distance W between the left and right side walls 22a, 22b in the same manner as in FIG. 2.

EXAMPLE

Example 1 and Comparative Examples 1, 2 and 3

A model having the same structure as the mixing apparatus as shown in FIGS. 1 to 5 but having a size of ¼ of the mixing apparatus was prepared. The model was disposed in a flow path made of a transparent water vessel, and a polybutene liquid having the same flow characteristics as molten glass was supplied to the flow path conduct tests on the mixing function.

Namely, a tracer liquid (ink) was dropped from an upper stream side of the model of mixing apparatus along with the supply of the polybutene liquid, and mixing effects in a surface layer, a middle layer and a bottom layer of the flow path were observed. In evaluation, ⊙ indicates a state that 100% of mixing was conducted and any stripe of the tracer was not found after the mixing, ○ indicates that 100% of mixing was conducted and stripes of the tracer were found after the mixing, Δ indicates that a part of the polybutene liquid was freely passed, and × indicates that 100% of the polybutene liquid was freely passed.

Four kinds of samples were prepared. Namely, the gap s between a left side wall 12a or a right side wall 12b for the flow path 12 and an outer peripheral edge of a mixing blade 14 was 0.05 times as much as the distance W between the left and right side walls 12a, 12b (Example 1). The shape of the blades was not a wedge shape in cross section but a rhomboid shape in cross section as shown in FIG. 13b, and the gap s was 0.05 times as the distance W (Comparative Example 1). The shape of the blades was a rhomboid shape in cross section, and the gap s was 0.02 times as the distance W (Comparative Example 2). The shape of the blades was a rhomboid shape in cross section, and the gap s was 0.12 times as the distance W (Comparative Example 3). Tests were conducted on these samples. A result is shown in Table 1.

TABLE 1

| | Gap S × W | Cross-sectional shape of blade | Revolution number | Effect of mixing Surface layer | Middle layer | Bottom layer |
|---|---|---|---|---|---|---|
| Example 1 | 0.05 | Wedge shape | 9.0 | ⊚ | ○ | ○ |
| Comparative Example 1 | 0.05 | Rhomboid shape | 9.0 | Δ | ○ | ○ |
| Comparative Example 2 | 0.02 | Rhomboid shape | 9.0 | x | ○ | ○ |
| Comparative Example 3 | 0.12 | Rhomboid shape | 9.0 | x | ○ | ○ |

Example 2 and Comparative Example 4

Cathode-ray tubes were prepared by using molten glass with use of the mixing apparatus of the present invention as shown in FIGS. 1 to 5 (Example 2). Cathode-ray tubes were prepared in the same manner as above except that the conventional mixing apparatus as shown in FIG. 13 was used (Comparative Example 4).

In measuring occurrence of defective products containing air bubbles, occurrence of defective products in Example 2 was as half as that of Comparative Example 4.

As described above, according to the present invention, the gap between a left side wall or a right side wall for the flow path and an outer peripheral edge of a mixing blade is not less than 0.04 times as much as the distance between the left and right side walls, whereby erosion of the left and side walls can be suppressed; an adverse effect to the quality of glass products can be prevented, and disturbance of the surface of molten substance due to the mixing function is minimized to thereby prevent air bubbles from mixing. Further, the gap between a left side wall or a right side wall for the flow path and an outer peripheral edge of a mixing blade is not more than 0.1 times as much as the distance between the left and right side walls. Accordingly, a molten substance of high temperature can be prevented from freely passing, and a sufficient homogenization by mixing can be maintained.

Further, according to the mixing apparatus shown in FIGS. 6 to 10, a lubricant circulation passage for circulating lubricant through a lower bearing member, a sleeve, an upper bearing member and a gear box to be returned to the lower bearing member by the aid of a pump is provided. Accordingly, the lubricant is always supplied to the bearing members and the gear box, and wearing of the bearing members and the gear box can be prevented even when an upper portion of the flow path for the molten substance of high temperature becomes a high temperature atmosphere whereby a long term continuous operation can be possible.

Further, by providing a water cooled jacket to surround an outer periphery of the sleeve, deterioration of shaft seal portions for the lubricant, which are provided in the bearing members, can be prevented, and the lubricant is cooled by the water cooled jacket when it is passed through the sleeve whereby the temperature of the lubricant can be kept properly.

Further, when vertically spaced two shaft seal portions are provided in the lower bearing member and a discharging passage is formed in the lower bearing member to communicate with a space between the shaft seal portions, lubricant leaking from an upper shaft seal portion can be discharged through the discharging passage. Accordingly, the lubricant can be prevented from mixing with the molten substance of high temperature. Further, a timing of maintenance can be certainly known by judging a degree of deterioration of the shaft seal portions.

What is claimed is:

1. A mixing apparatus for a molten substance of high temperature which comprises a plurality of mixing units for mixing a molten substance of high temperature in a flow path for passing the molten substance, which is defined by left and right side walls, wherein the plurality of mixing units are arranged in a side-by-side relation so as to traverse the flow path, and mixing blades of adjacent mixing units are rotated in a state of substantially meshing with each other, said mixing apparatus being characterized in that a minimum gap between a left side wall or a right side wall and an outer peripheral edge of a mixing blade is 0.04–0.1 times as much as a distance between the left and right side walls, each of the mixing blades having a wedge shape in cross section in the observation of the blade from a direction tangential to a circle of rotation of the blade wherein a working face which inclines upward from a front part to a rear part with respect to a direction of rotation of the blade, is formed.

2. The mixing apparatus according to claim 1, wherein the plurality of mixing units in the flow path are such that an even number of pairs of mixing units are arranged symmetrically with respect to the center line of a left side and a right side in a longitudinal direction in the flow path.

3. The mixing apparatus according to claim 2, wherein each of the mixing blades has an angle of intersection of 55°–80° between a working face formed in the blade and a rotating shaft provided in each of the mixing units.

4. The mixing apparatus according to claim 1, wherein each of the mixing blades has a diameter of not more than 40% of the distance between left and right side walls for defining the flow path.

5. A mixing apparatus for a molten substance of high temperature which comprises a plurality of mixing units for mixing a molten substance of high temperature in a flow path for passing the molten substance, which is defined by left and right side walls, wherein the plurality of mixing units are arranged in a side-by-side relation so as to traverse the flow path, and mixing blades of adjacent mixing units are rotated in a state of substantially meshing with each other, wherein a minimum gap between a left side wall or a right side wall and an outer peripheral edge of a mixing blade is 0.04–0.1 times as much as a distance between the left and right side walls, wherein each of the mixing units has a rotating shaft which has an outer peripheral surface in its lower portion, with which mixing blades for mixing the molten substance of high temperature are attached; an upper portion of the rotating shaft is supported by a plurality of vertically spaced bearing members and an upper end of the rotating shaft is inserted into a gear box; a sleeve is disposed between the vertically spaced bearing members so as to surround the rotating shaft; a lubricant circulation passage is formed to circulate lubricant from a lower bearing member through the sleeve, an upper bearing member and the gear box to the lower bearing member, and a pump is provided to circulate the lubricant through the lubricant circulation passage.

6. The mixing apparatus according to claim 5, wherein a water cooled jacket is disposed to surround an outer periphery of the sleeve.

7. The mixing apparatus according to claim 5, wherein the lower bearing member is provided with two shaft seal portions to seal an axial end portion of the lubricant circulation passage, and a discharge port is formed to communicate a space formed between the two shaft seal portions whereby lubricant leaking from an upper shaft seal portion is discharged.

8. The mixing apparatus according to claim 1 wherein the molten substance of high temperature is molten glass.

* * * * *